United States Patent

Sabathie

[11] Patent Number: 6,161,876
[45] Date of Patent: Dec. 19, 2000

[54] ELBOW CONNECTION FOR TUBULAR MANIFOLD FOR A MOTOR VEHICLE AIR-CONDITIONING CONDENSER

[75] Inventor: Pierre Sabathie, Maurepas, France

[73] Assignee: Valeo Thermique Moteur, La Verriere, France

[21] Appl. No.: 08/793,383

[22] PCT Filed: Jun. 18, 1996

[86] PCT No.: PCT/FR96/00938

§ 371 Date: Feb. 21, 1997

§ 102(e) Date: Feb. 21, 1997

[87] PCT Pub. No.: WO97/01059

PCT Pub. Date: Jan. 9, 1997

[30] Foreign Application Priority Data

Jun. 22, 1995 [FR] France ................................. 95 07512

[51] Int. Cl.[7] ................................................ F16L 35/00
[52] U.S. Cl. ..................... 285/39; 285/179.1; 285/197; 285/222; 285/288.6; 285/288.11; 285/901; 285/906; 138/89; 228/136
[58] Field of Search ........................ 285/197, 222, 285/205, 288.5, 288.6, 289.2, 289.3, 179.1, 179.2, 288.11, 901, 39, 126.1, 906; 138/89; 228/136

[56] References Cited

U.S. PATENT DOCUMENTS

| | | | |
|---|---|---|---|
| 1,801,006 | 4/1931 | Jacoby | 285/901 X |
| 1,841,523 | 1/1932 | Crowe et al. | 285/198 |
| 1,861,314 | 5/1932 | McAndrew | 285/179.1 X |
| 2,286,566 | 6/1942 | Norton | 285/126.1 X |
| 3,289,287 | 12/1966 | Guritz | 285/222 X |
| 4,811,759 | 3/1989 | Billoue | 138/89 |
| 5,207,461 | 5/1993 | Lasko | 285/197 X |
| 5,785,119 | 7/1998 | Watanabe et al. | 285/222 X |

FOREIGN PATENT DOCUMENTS

| | | |
|---|---|---|
| 571296 | 2/1933 | Germany ................. 285/222 |
| 31 48 332 | 6/1983 | Germany . |
| 94 07 248 | 9/1994 | Germany . |
| 2 051 991 | 1/1981 | United Kingdom . |
| 2 118 264 | 10/1983 | United Kingdom . |
| 2 254 119 | 3/1991 | United Kingdom . |

*Primary Examiner*—Dave W. Arola
*Attorney, Agent, or Firm*—Morgan & Finnegan LLP

[57] ABSTRACT

A device inserted through a tubular wall by means of a cylindrical flange surrounding a through-bore which is used to insert a tool for flaving the annular region defined by the flange around the bore on the inside of said wall, so that the device may be mechanically secured thereto. The bore is then plugged with a disc and the whole assembly is sealed by brazing.

5 Claims, 1 Drawing Sheet

ELBOW CONNECTION FOR TUBULAR MANIFOLD FOR A MOTOR VEHICLE AIR-CONDITIONING CONDENSER

BACKGROUND OF THE INVENTION

The invention relates to a connection device for a fluid chamber of a heat exchanger which chamber is bounded by a tubular wall, especially for a condenser manifold in a system for air-conditioning the cabin of a motor vehicle, this device comprising a cylindrical end piece which can fit in an opening made in the said tubular wall, in a first direction substantially perpendicular to the axis of this wall, and can be brazed to this wall so that it is leaktight, and in which end piece there emerges a first bore pointing in the first direction, the first bore communicating with a second bore pointing in a second direction different from the first direction, which emerges on the outside of the device in order to provide connection to a fluid circuit external to the said heat exchanger.

In a known device, the first bore ends, at the opposite end from the end piece, in the second bore which runs parallel to the axis of the tubular wall. The two bores are made in one and the same metal component.

When it is put in the brazing furnace, it is necessary for the connection device to be immobilized with respect to the tubular wall in the relative position it is to occupy after brazing. An external brazing jig may be used for this purpose. However, the deformations of this jig as a result of the thermal cycles make it difficult to maintain the dimensional tolerances needed to carry out the holding function under acceptable conditions. It is therefore desirable to achieve mechanical attachment of the device to the tubular wall. In some cases, especially when the tubular wall is formed of several assembled parts, it is possible to insert a tool into the first bore, from the end of the end piece, in order to flare this end piece and thus obtain this attachment. However, this option is not always available. Moreover, the L-shaped cavity formed by the first bore and the second bore of the device of the prior document also does not allow a flaring tool to be inserted through this device.

BRIEF SUMMARY OF THE INVENTION

The object of the invention is to overcome these drawbacks and to allow a tool to be inserted for deforming the end piece irrespective of the configuration of the tubular wall.

The invention is particularly aimed at a device of the type defined in the introduction, and makes provision for the first bore also to emerge, at its opposite end to the end piece, in such a way as to allow the insertion therein of a tool capable of deforming the end piece radially outward in order to attach it mechanically to the inside of the tubular wall before brazing, and for the device to include a shut-off member which can be put in place at the said opposite end and be fixed therein by brazing in order to close the first bore in a sealed way after the said tool has been withdrawn.

Optional features of the device according to the invention, which may be presented in addition or as alternatives, are given below:

it has an external shoulder adjacent to the end piece and by means of which it can press against at least one generatrix of the tubular wall.

the shut-off member is a disk which can come to bear on an internal shoulder of the first bore.

it includes at least one projection adjacent to the first bore extending beyond the outer face of the disk and able to be knocked over at least partially onto this face by deformation in order to hold the disk in place before brazing.

the first bore and the second bore are made in a single component.

Another subject of the invention is a method for connecting a heat exchanger fluid chamber bounded by a tubular wall by means of a device as defined hereinabove, in which method the device is shifted in the first direction so as to fit the end piece into the said opening of the tubular wall, a tool is inserted inside the first bore, using which tool the end piece is deformed radially outward in order to attach it mechanically to the inside of the tubular wall, the tool is withdrawn, the shut-off member is put in place at the said opposite end of the first bore, and the end piece is secured to the tubular wall and the first bore is closed by the shut-off member, in leaktight fashion by brazing.

If there is/are a/any projection (projections), then before brazing is carried out this/these is/are knocked down onto the outer face of the tubular wall.

Advantageously, the said brazing is carried out at the same time as at least one other brazing operation intended for assembling various constituent parts of the heat exchanger and/or for joining a rolled sheet edge to edge to form the said tubular wall, by immersing all of the components to be brazed in an atmosphere which is brought up to a temperature high enough to melt a brazing material present on the surfaces in question.

BRIEF DESCRIPTION OF THE DRAWINGS

The features and advantages of the invention will be explained in greater detail in the description below, with reference to the appended drawings in which identical or similar elements are denoted by the same reference numerals in all the figures. In these drawings.

DETAILED DESCRIPTION OF THE INVENTION

Figure 1:
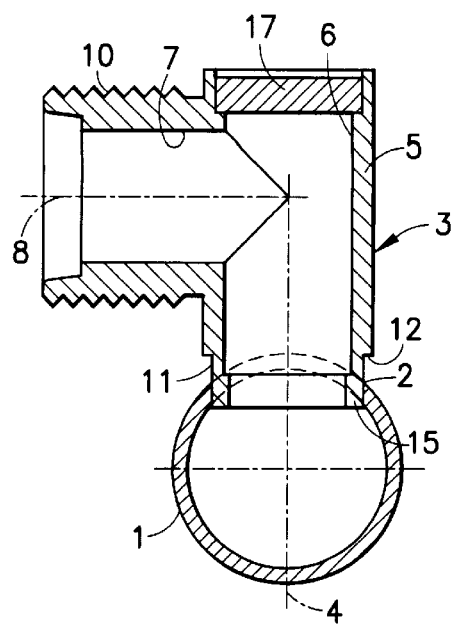
FIG. 1 is a view in section, on the line I—I of FIG. 2, of a connection device according to the invention mounted on a condenser tubular manifold.
Figure 2:
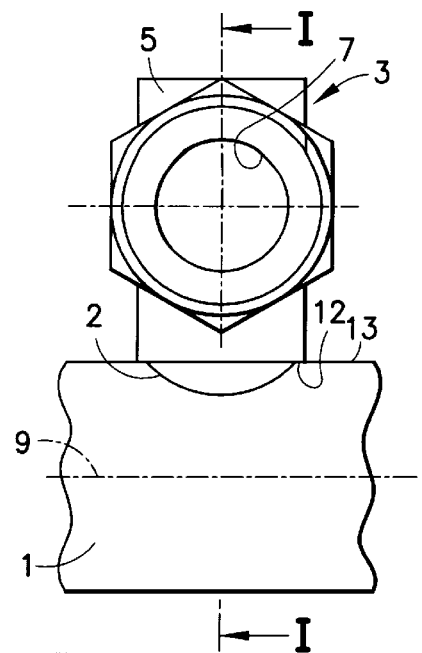
FIG. 2 is a partial view in elevation of the set-up of FIG. 1.

The tubular wall 1 represented in FIG. 1 and represented partially in FIG. 2 belongs to a manifold of a condenser forming part of the system for air-conditioning the cabin of a motor vehicle. An opening 2 is made in the wall 1 to take the connection device 3 intended to allow the inlet of refrigerant into the condenser or the outlet of refrigerant from the condenser. The edge of the opening 2 is arranged on a cylindrical surface which has symmetry of revolution and the axis 4 of which extends along a diameter of the circular cross section of the wall 1. The device 3 essentially comprises a component 5 made of aluminum alloy, in which two bores 6 and 7 are made. The first bore 6 has symmetry of revolution about the axis 4 and passes right through the component 5. The second bore 7 also has symmetry of revolution, its axis 8 intersecting the axis 4 substantially at right angles and also being substantially perpendicular to the axis 9 of the tubular wall 1. The bore 7 communicates via one end with the bore 6 and emerges via its other end outside the component 5, this component defining an end piece 10 which is coaxial with the bore 7 and has an external screw thread for coupling it to a fluid pipe. The component 5 enters the opening 2 by means of another end piece 11, which is cylindrical of revolution and coaxial with the bore 6, fitting into the opening with a small clearance. The end piece 11 is bounded by a shoulder 12 perpendicular to the axis 4, by means of which shoulder the component 5 bears on a generatrix 13 of the tubular wall 1.

Because the bore 6 passes through the component 5 it is possible to insert therein, via its opposite end 14 to the end piece 11, after the latter has been fitted into the opening 2 until the shoulder 12 comes to bear on the wall 1, a known tool allowing the annular wall 15 defined by the end piece 11 around the bore 5 [sic] to be deformed radially outward inside the tubular wall 1 in order mechanically to attach the component 5 to the tubular wall. Near the end 14, the bore 6 has a shoulder 16 facing toward this end and on which, after the deformation tool has been extracted, a disk 17 made of aluminum alloy can press, which disk thus becomes housed in the bore 6.

Before they are assembled, at least the tubular wall 1 and the disk 7 are covered in the known way with a brazing material which will allow the three components 1, 5 and 7 to be brazed simultaneously in order to make them leaktight with respect to the refrigerant at the joint between the wall 1 and the end piece 11 and will allow the bore 6 to be shut off by the disk 17.

Figure 3:
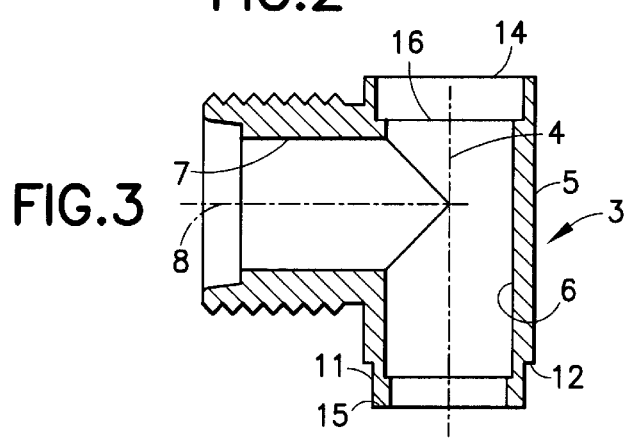
FIG. 3 is a view similar to FIG. 1, showing separately the component in which the two bores of the device are made.
Figure 4:
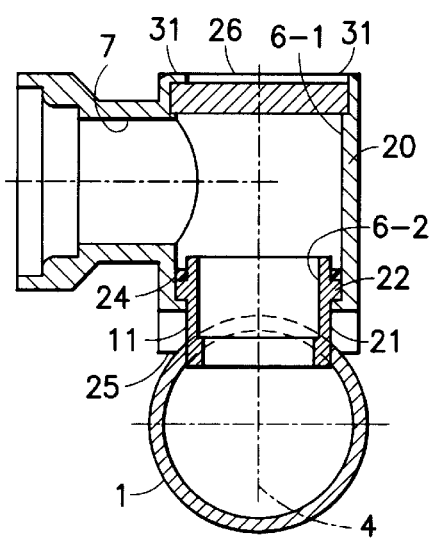
FIG. 4 is a view similar to FIG. 1 relating to an alternative form.
Figure 5:
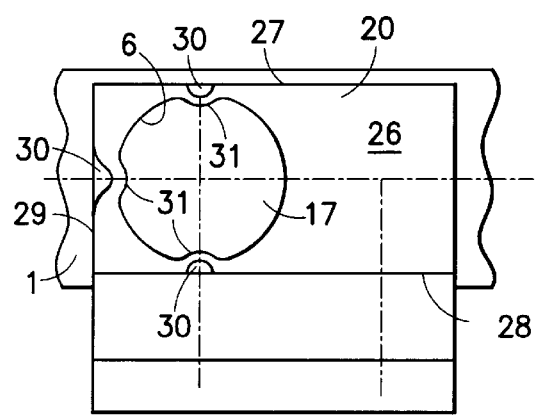
FIG. 5 is a view from above of the set-up of FIG. 4.

The device illustrated in FIGS. 4 and 5 is similar to the one in FIGS. 1 to 3 as far as its essential features are concerned. Only the significant elements in which it differs therefrom will therefore be described below.

The single component 5 in which the bores 6 and 7 were made is here replaced by two assembled components, namely a component 20 defining the upper part 6-1 of the bore 6 and the bore 7, and a component 21 of tubular shape, which is internally matched to the lower part of the component 20 and projects downward therefrom to define the lower part 6-2 of the bore 6 and the end piece 11. The component 21 has a radially external annular flange 22 which bears downward on an internal shoulder of the component 20, and above which a ring of brazing metal 24 is arranged, this allowing the two components to be secured together. The connection device bears externally on the tubular wall 1 via the lower end 25 of the component 20.

It can be seen in FIG. 5 that the component 20 has an upper face 26 of rectangular shape, of which the two long sides 27 and 28, and the one 29 of the short sides, run close to the upper end of the bore 6. By striking these edges using an appropriate tool at these points, indentations 30 are made and the material of the component is pushed back locally radially toward the axis 4 of the bore above the disk 17, in the form of lips 31 which serve to immobilize this disk before brazing.

What is claimed is:

1. A connection device for a fluid chamber of a heat exchanger in a system for air-conditioning the cabin of a motor vehicle, the chamber being bounded by a tubular wall having an opening comprising:

a cylindrical end piece partially covered in brazing material adapted to fit in said opening made in the tubular wall in a first direction substantially perpendicular to an axis of the tubular wall;

said cylindrical end piece being aligned with a first bore pointing in the first direction;

the first bore communicating with a second bore pointing in a second direction different from the first direction;

said second bore emerging on the outside of the device in order to provide connection to a fluid circuit external to the heat exchanger;

wherein the first bore also emerges at an opposite end to the end piece so as to allow the insertion therein of a tool capable of deforming the end piece radially outward in order to attach the end piece mechanically to the inside of the tubular wall before brazing; and a shut-off member capable of being put in place at the opposite end and be fixed therein in order to close the first bore in a sealed way.

2. A method for connecting a heat exchanger fluid bounded by a tubular wall chamber in a system for air-conditioning the cabin of a motor vehicle comprising the steps of:

shifting a connection device in the first direction so as to fit an end piece located at a first end of the connection device into an opening of the tubular wall, inserting a tool into a first bore to deform the end piece radially outward to attach the end piece mechanically to the inside of the tubular wall, withdrawing the tool, disposing a shut-off member at a second end of the first bore located opposite to the first end, and brazing the end piece to the tubular wall and the first bore with the shut-off member.

3. Method according to claim 2, wherein before brazing is carried out any of at least one of a plurality of projections is knocked down onto the outer face of the tubular wall.

4. Method according to claim 2, wherein said brazing is carried out at the same time as the brazing of one of the connection device, end-piece, and tubular wall.

5. Method of claim 4, wherein said brazing is carried out by immersing the shut-off device and one of the connection device, end-piece, and tubular wall in an atmosphere which is brought up to a temperature high enough to melt a brazing material present on surfaces of the shut-off device and one of the connection device, end-piece, and tubular wall.

* * * * *